US009066330B2

United States Patent
Hang et al.

(10) Patent No.: US 9,066,330 B2
(45) Date of Patent: Jun. 23, 2015

(54) SIMULTANEOUS VOICE AND DATA FOR DUAL-SIM-DUAL-STANDBY (DSDS) WIRELESS DEVICE

(71) Applicant: QUALCOMM Incorporated, San Diego, CA (US)

(72) Inventors: Ling Hang, San Diego, CA (US); Chih-Ping Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 14/041,672

(22) Filed: Sep. 30, 2013

(65) Prior Publication Data
US 2015/0094071 A1    Apr. 2, 2015

(51) Int. Cl.
*H04W 72/00* (2009.01)
*H04M 1/00* (2006.01)
*H04W 76/02* (2009.01)

(52) U.S. Cl.
CPC ................................ *H04W 76/028* (2013.01)

(58) Field of Classification Search
CPC ... H04W 76/025; H04W 48/18; H04W 60/00; H04W 60/005; H04W 60/06; H04W 76/02; H04W 76/045; H04W 76/04; H04W 76/064; H04W 76/066; H04W 36/18; H04W 36/023; H04M 1/00; H04L 29/06319
USPC .................. 455/73, 406–408, 410–411, 415, 455/418–420, 435.1–452.2, 451, 455/452.1–452.2, 509, 550.1, 551, 552.1, 455/556.2, 558; 370/328, 329, 338, 341
See application file for complete search history.

(56) References Cited

U.S. PATENT DOCUMENTS 8,406,741 B2    3/2013 Kang et al.
8,554,167 B2 *  10/2013 Geary et al. ............... 455/343.3
(Continued)

FOREIGN PATENT DOCUMENTS

GB     2492536 A      9/2013
WO     2013007869 A1  1/2013

OTHER PUBLICATIONS

Ericsson: "Dual-SIM Dual-Standby UEs and their impact on the RAN", 3GPP Draft; R2-115375 Dual-SIM Dual-Standby UES and Their Impact on the RAN, 3rd Generation Partnership Project (3GPP), Mobile Competence Centre ; 650, Route Des Lucioles ; F-06921 Sophia-Antipolis Cedex ; France, vol. RAN WG2, no. Zhuhai; 20111010, Oct. 3, 2011, XP050540879, pp. 1-3, [retrieved on Oct. 3, 2011].

(Continued)

*Primary Examiner* — Meless Zewdu
(74) *Attorney, Agent, or Firm* — The Marbury Law Group, PLLC

(57) ABSTRACT

Methods, systems and devices are provided for controlling a communication device. Embodiments include receiving, through the transceiver, a voice call from a first network subscription associated with a first SIM of the communication device. The voice call may interrupt an active data services session through the transceiver with a second network subscription associated with a second SIM of the communication device. Also, embodiments include establishing an active voice communication connection for the voice call on the transceiver with the first network subscription. Additionally, reestablishing the active data services session through the transceiver with the first network subscription while maintaining the active voice communication connection for the voice call with the first network subscription.

24 Claims, 6 Drawing Sheets

(56) References Cited

U.S. PATENT DOCUMENTS

| | | | |
|---|---|---|---|
| 8,576,901 B2* | 11/2013 | Tat et al. | 375/222 |
| 8,934,460 B1* | 1/2015 | Hu et al. | 370/337 |
| 8,954,111 B2* | 2/2015 | Geary et al. | 455/552.1 |
| 2002/0122401 A1* | 9/2002 | Xiang et al. | 370/338 |
| 2007/0118662 A1* | 5/2007 | Vishwanathan et al. | 709/227 |
| 2008/0014938 A1* | 1/2008 | Hart et al. | 455/435.1 |
| 2010/0009716 A1 | 1/2010 | Lee et al. | |
| 2012/0108294 A1* | 5/2012 | Kaul | 455/558 |
| 2013/0005394 A1 | 1/2013 | Geary et al. | |
| 2013/0065644 A1 | 3/2013 | Bishop et al. | |
| 2013/0316764 A1* | 11/2013 | Mehio et al. | 455/558 |
| 2014/0148178 A1* | 5/2014 | Wippich | 455/450 |

OTHER PUBLICATIONS

International Search Report and Written Opinion—PCT/US2014/056147—ISA/EPO—Jan. 8, 2015.

* cited by examiner

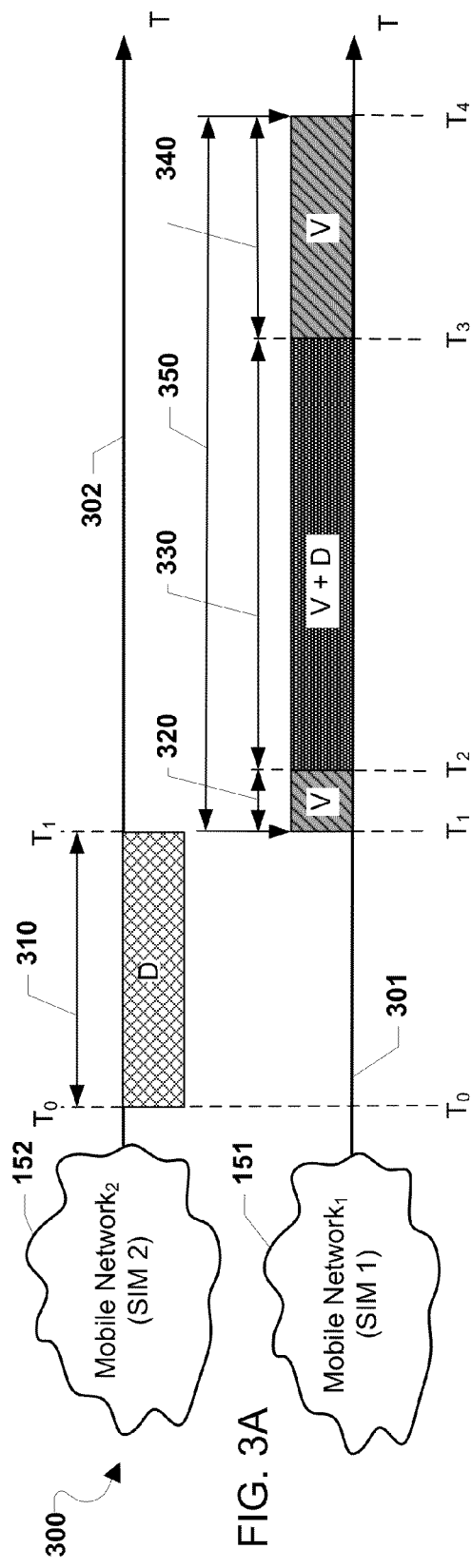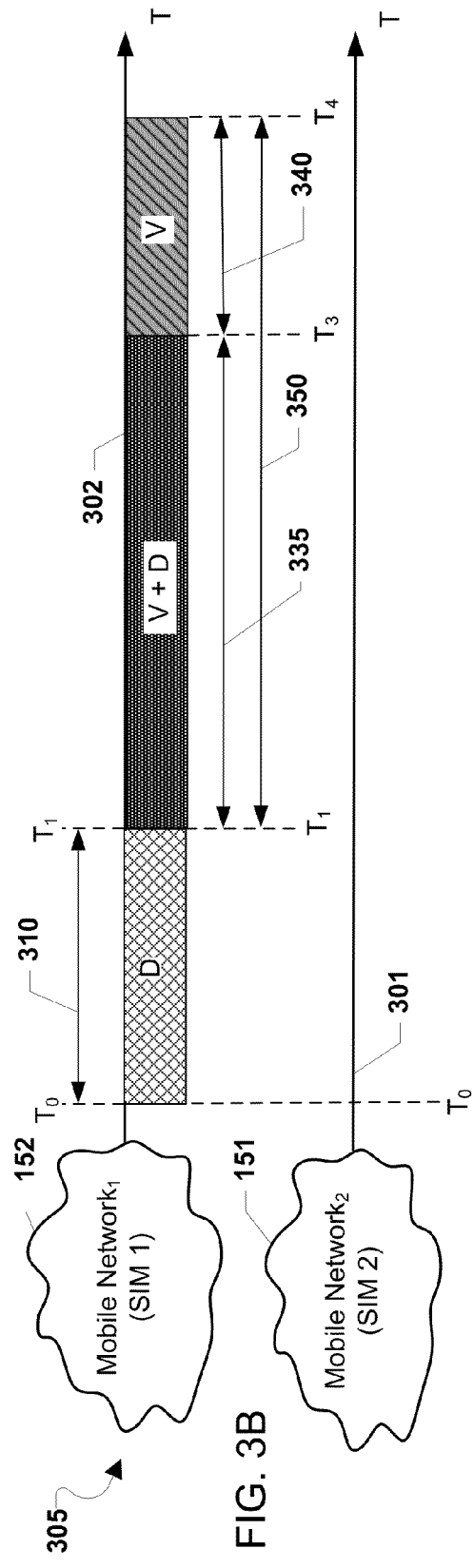

SIMULTANEOUS VOICE AND DATA FOR DUAL-SIM-DUAL-STANDBY (DSDS) WIRELESS DEVICE

BACKGROUND

Some wireless communication devices—such as smart phones, tablet computers, and laptop computers—contain more than one Subscriber Identity Module (SIM) that provides users with access to a particular mobile telephony network for each SIM card. Examples of mobile telephony networks include GSM, TDSCDMA, CMA2000, and WCDMA. A Dual SIM wireless device is one which holds two SIM cards, which means the device can handle two different network subscriptions. Each network subscription can be assigned to a different account or telephone number. In wireless devices that include only one transceiver, only one of the two subscriptions may be transmitting or receiving radio frequency (RF) signals at a time. Such devices are referred to as Dual SIM Dual Standby (DSDS) devices, since while one subscription is actively transmitting or receiving the other subscription is put on standby. In contrast, in wireless devices that include two transceivers and two SIM cards, referred to as Dual SIM Dual Active (DSDA) devices, both subscriptions may be actively transmitting or receiving at the same time.

Although DSDS devices may be configured with two different network subscriptions (one for each SIM) only one of those subscriptions needs to support a data connection. Unlike voice services that have a specific phone number associated with each subscription, having data services on one subscription is often sufficient to provide all the data services needed by the user independent of the other subscription. With this configuration, a DSDS device may have one network subscription for both data and voice services and the other subscription intended for only providing voice communications. Data services activated on only one subscription and the corresponding network subscription for such data services are referred to herein as the "dedicated data subscription" (DDS). Services that support voice calls only are often referred to as "voice-only service" or "non-DDS services," and network subscriptions primarily providing voice communications are referred to herein as a "non-DDS". Network subscription primarily providing voice communications are generally governed by a talk plan and may not include data services. Alternatively, the network subscription primarily providing voice communications may include data services, but just not the preferred data services. Such subscription schemes are often chosen based on data/voice plan costs and/or reliability.

Using conventional DSDS devices such a configuration of subscriptions cannot maintain a data services session (i.e., downloading or uploading data) initiated using one SIM when a voice call is received through the second SIM. Typically, the active data services session on a first SIM must be put on standby in order to activate the voice communication connection on a second SIM. For example, when a traditional DSDS device is downloading a data file (i.e., a music file) using SIM2 and receives a voice call from the network subscription of SIM1, the data download must be discontinued until the voice call has ended.

While DSDA devices enable simultaneous voice and data communications, such devices are generally far more costly and require more power to operate than DSDS devices.

SUMMARY

The various embodiments include methods for managing a communication device with SIMs sharing a transceiver. The embodiment methods include receiving through the transceiver a voice call for a first subscription associated with a first SIM of the communication device, the voice call interrupting an established data services session through the transceiver using a second subscription associated with a second SIM of the communication device, establishing the voice call on the transceiver, and reestablishing the data services session through the transceiver using the first subscription while maintaining the voice call.

Further embodiments include a computing device having a processor configured with processor-executable instructions to perform operations of the embodiment methods. Further embodiments may include a computing device having various means for performing functions of the embodiment methods. Further embodiments may include a non-transitory processor-readable storage medium having stored thereon processor-executable instructions configured to cause a processor to perform operations of the embodiment methods.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 3A is a time-line diagram of the activity of two SIMs sharing a transceiver according to an embodiment.

FIG. 3B is an alternative time-line diagram of the activity of two SIMs sharing a transceiver according to an embodiment.

DETAILED DESCRIPTION

Figure 1:
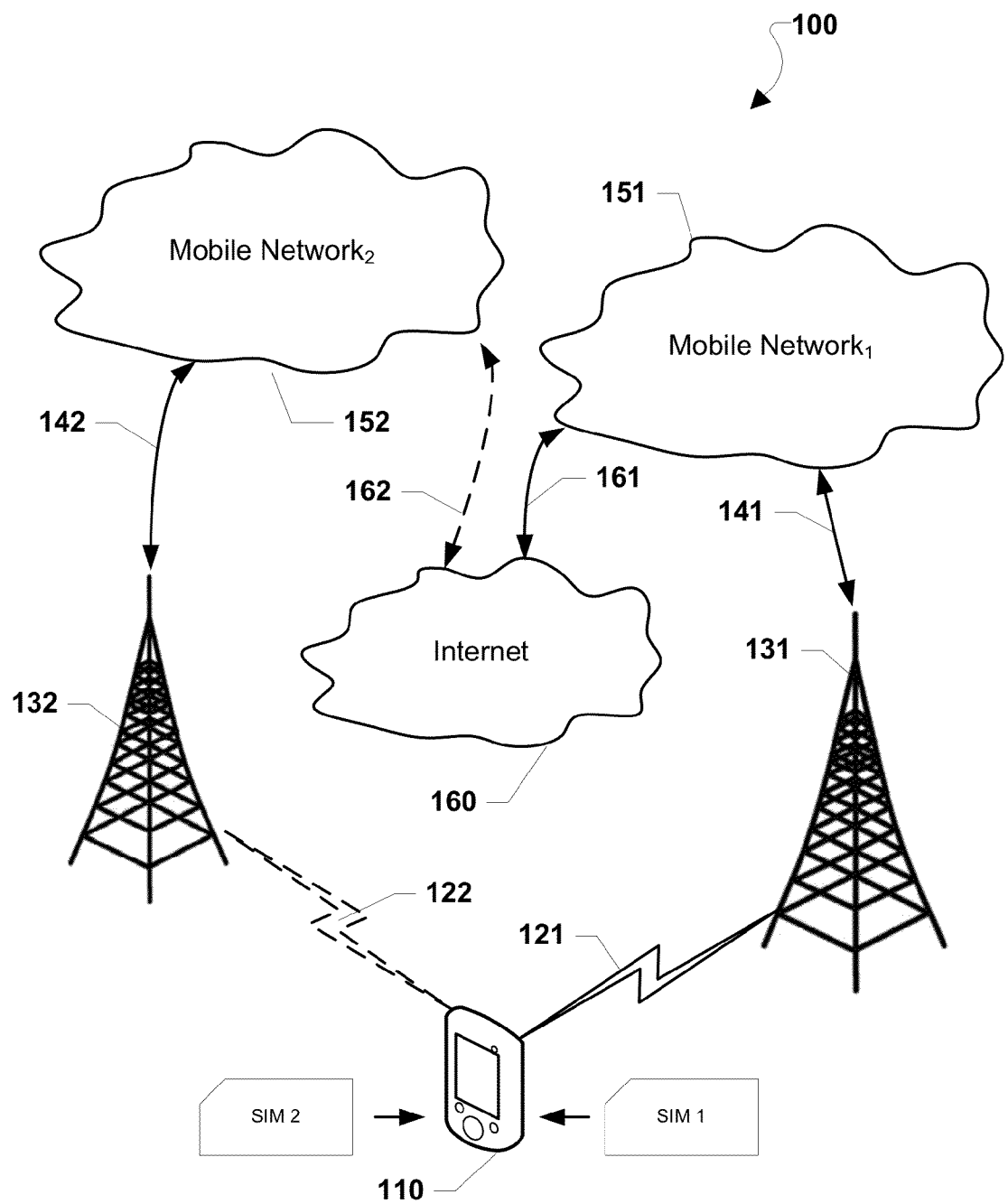
FIG. 1 is a communication system schematic diagram of a communication system suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "wireless device," "wireless communication device," or "communication device" are used interchangeably to refer to any one or all of cellular telephones, smart phones, personal or mobile multi-media players, personal data assistants, laptop computers, personal computers, tablet computers, smart books, palm-top computers, wireless electronic mail receivers, multimedia Internet enabled cellular telephones, wireless gaming controllers, and similar personal electronic devices that include a programmable processor, memory and circuitry for establishing wireless communication pathways and transmitting/receiving data via wireless communication pathways to mobile communication networks. The various embodiments referred to herein may be useful in any electronic device that may individually maintain a plurality of subscriptions to a plurality of mobile communication networks through an RF transceiver.

As used herein, the terms "SIM", "SIM card" and "subscriber identification module" are used interchangeably to mean an integrated circuit, which may be embedded into a removable card or incorporated within memory of the device, that stores an International Mobile Subscriber Identity (IMSI), related key, and/or other information used to identify and/or authenticate a wireless device on a network. The term SIM may also be used as shorthand reference to a communication network associated with a particular SIM, since the information stored in a SIM enables the wireless device to establish a communication link with a particular mobile communication network, thus the SIM and the communication network correlate to one another.

A SIM in the various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM). Each SIM card may have a CPU, ROM, RAM, EEPROM and I/O circuits. The SIM cards used in the various embodiments may contain user account information, an international mobile subscriber identity (IMSI), a set of SIM application toolkit (SAT) commands and storage space for phone book contacts. A micro-processing unit (MCU) of a baseband chip may interact with MCUs of SIM cards to retrieve data or SAT commands from the SIM cards installed in a wireless device. A wireless device may be immediately programmed after plugging in the SIM card. SIM cards may be also programmed to display custom menus for personalized services. A SIM card may further store a Home Public-Land-Mobile-Network (HPLMN) code to indicate the SIM card network operator provider. An Integrated Circuit Card Identity (ICCID) SIM serial number is generally printed on the SIM card for identification.

As used herein, the term "voice call" refers to the delivery of voice communications over a telecommunications network, such as for example a cellular telephone network. A voice call may be implemented using various technologies enabling at least audio inputs to be communicated remotely.

As used herein, the term "data services session" refers to one or more periods of time during which a related set of data that is exchanged through a telecommunications service is actively transmitted to and/or received from a communication device. The period associated with a data services session may be discontinuous, but the set of data is related in some intentional way, such as a grouping of data that belongs together, is intended to be used together or can not be used separately. Also, the set of data may be related in its common source or destination. The data received and/or transmitted are the quantities, characters, or symbols on which operations are implemented by a computing device, including hardware, software, firmware, or any combination thereof. A software update download, streaming audio and/or video, uploading photographs, general Internet access, e-mail services and text messaging are common forms of data services that may be part of a data services session provided through a telecommunications network subscription. Often it is desirable to have a data services session run uninterrupted or at least virtually uninterrupted. In this way the data services session or at least the related data being exchanged does not have a break in continuity. A virtually uninterrupted data services session may in fact have a break in continuity, but when the data exchange resumes it picks-up where it left off or includes sufficient redundancies as required by either the transmitting or receiving device. In this way, a data services session may include a subsequent segment of data (i.e., a second segment of data) received/transmitted after the exchange of an earlier segment of data (i.e., a first segment of data) is interrupted. The earlier and subsequent segments of data are clearly interrelated and together form a larger, and preferably continuous, segment of data.

In overview, the various embodiments provide methods and systems for managing a communication device with dual SIMs sharing a single transceiver or radio frequency (RF) circuit (also referred to as an RF chain). In particular, the various embodiments enable the emulation of DSDA functionality on a DSDS device. For example, the various embodiments may be applied in a communication device configured with two SIMs sharing the same transceiver in which one of the SIM network subscriptions includes a data services subscription while the other SIM subscription is not configured to typically use/access data services (i.e., a non-data services subscription, such as voice-only services). Using dynamic data services, a DSDS device may establish a voice call on a network subscription originally configured for voice-only services (a first network subscription or first SIM), and switch data services interrupted by the voice call from another network subscription configured for data services (a second network subscription or second SIM) to the first network subscription. The voice call is said to interrupt the data services session because in order to establish the voice call, the SIM associated with the data services network subscription must be inactive, which means the corresponding data services session must be stopped. By dynamically switching the data services session from one SIM to another, a DSDS communication device may emulate DSDA functionality by giving the user the impression that a data services session is maintained/continues, even though that data services session was technically interrupted and reestablished via the network subscription or SIM supporting the voice call while maintaining the voice call.

FIG. 1 illustrates an exemplary communication system 100 including a wireless device 110 that is a DSDS device in accordance with the various embodiments. The wireless device 110 includes two SIM cards, SIM 1, SIM2. Thus, using one of its SIM cards (SIM 1), the wireless device 110 may be in communication with the first mobile network 151 (Mobile Network$_1$) through a cellular connection 121 to a first base station 131 with connections 141 to the first mobile network 151. Also, using the other SIM card (SIM 2), the wireless device 110 may alternatively be in communication with the second mobile network 152 (Mobile Network$_2$) through another cellular connection 122 to a second base station 132 with connections 142 to the second mobile network 152. Those mobile networks 151, 152 may provide access to the Internet 160 through online connections 161, 162, particularly when a data plan is included with the accessing network subscription. For illustrative purposes, the first mobile network 151 is shown as having an active communication connection with the wireless device 110 through a network subscription associated with SIM 1. Also, that active communication connection includes an online connection 161, which may be part of an active data services session. In contrast, the second mobile network 152 is shown as having an inactive communication connection with the wireless device 110, as reflected by the dotted lines illustrating the cellular connection 122. In this example, the wireless device 100 is a DSDS device, which means only one communication connection with a mobile network may be maintained at a time. The wireless device 100 may be using the first mobile network for a data services session because SIM1 is associated with a network subscription, such as a preferred data plan, while the network subscription associated with SIM2 may not have a data plan. Not having a data plan may mean access to the Internet 160 is not included as part of the subscribed services with the mobile network provider, as reflected by the dotted lines illustrating the online connection 162. Alternatively, the network subscription with the second mobile network 152 may include a data plan, but that network subscription is not the preferred data plan because it is more expensive or less reliable.

Considering that the wireless device 110 is a DSDS device, a single RF transceiver is used separately for each of the cellular connections 121, 122. Such cellular connections 121, 122 may be made through two-way wireless communication links, such as 4G, 3G, CDMA, TDMA, and other mobile telephony communication technologies. Moreover, each of the mobile networks 151, 152 may include wireless connections 141, 142, one or more base stations 131, 132, as well as one or more controllers, wireless/wired interfaces, physical layers and other components, as is known in the art. The two mobile networks 151, 152 may even share common equipment, such as the base stations and other elements. The embodiments are not limited to the configuration illustrated, thus alternate network configurations may be used.

Figure 2:
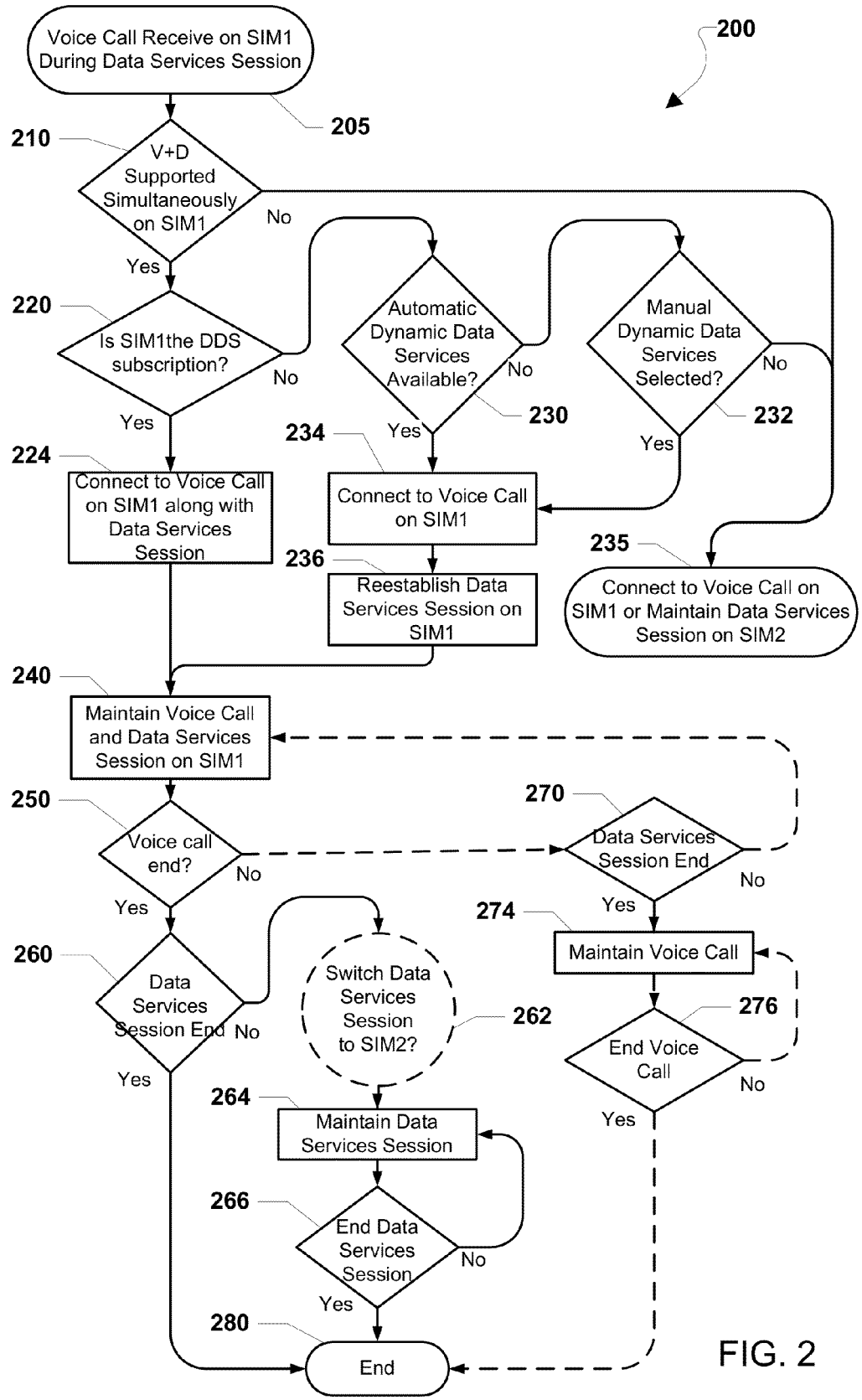
FIG. 2 is a process flow diagram illustrating an embodiment method of managing a communication device with dual SIMs sharing a transceiver according to an embodiment.

FIG. 2 illustrates an embodiment method 200 for managing two SIMs sharing one transceiver on a mobile communication device to enable it to handle a voice call on one subscription while maintaining active a data services session. The method 200 represented by the process flow particularly pertains to communications using a DSDS device (i.e., a device with one service subscription for each of two SIMs and both SIMs sharing the same transceiver). One network subscription associated with one SIM includes a data plan, while the other network subscription associated with the other SIM may only provide data services outside the customer's regular subscription or may provide non-preferred data services. The DSDS device will designate which ever SIM it is actively using data services as the "DDS," whether or not it is the preferred data services subscription. The process flow method 200 accounts for alternate scenarios in which the SIM receiving the voice call (SIM1) may be either the DDS or the non-DDS. Also, the process flow includes a scenario in which dynamic data services are handled automatically or manually, which switches an active data services session from one SIM to another in order to receive a voice call on the non-DDS. Additionally, while FIG. 2 shows a voice call on SIM1, a similar methodology would apply if the voice call were received on SIM2, although in that case references to "SIM1" and "SIM2" in the method 200 would be interchanged.

In block 205 a voice call is received on SIM1 while the device is actively handling a data services session. If a data services session is not active, the voice call will be established in a normal fashion. In determination block 210 a determination may be made as to whether SIM1 can handle simultaneous voice and data connections. The determination in determination block 210 may take into account preselected settings in the device, the technology of SIM1 (i.e., is the network subscription able to handle dual data and voice services) and/or current network conditions, such as connectivity. In this way, if available bandwidth detected on the network associated with the voice call, then the device may not support simultaneous voice and data services (V+D). If voice and data services cannot be supported simultaneously on SIM1 (i.e., determination block 210="No"), in block 235 the voice call may be accepted/established, but the data services session will be terminated. Alternatively in block 235, the data services session may be maintained/continued, but the voice call will not be established (i.e., the call would go unanswered). In other words, if simultaneous voice and data communication services are not supported on SIM1, in block 235 a choice may be made between continuing the data services session or establishing the voice call. Thus, in circumstances in which simultaneous voice and data communication services cannot be supported on SIM1, both the voice call and the data services session may not be maintained on SIM1 in block 235.

If simultaneous voice and data communication services are supported on SIM1 (i.e., determination block 210="Yes"), in determination block 220 a further determination may be made regarding whether the voice call is being received on the current DDS. In other words, the processor may determine whether the voice call is through the same network subscription, SIM1, as the already active data services session that designates the current DDS, SIM1. If the voice call is received on the current DDS (i.e., determination block 220="Yes"), in block 224 the voice call may be established (connected) on the same SIM, SIM1, without terminating the data services session. In this way, in block 240 the data services session may be maintained along with the voice call on the same SIM, SIM1.

If the voice call is not received on the network subscription currently designated as the DDS (i.e., determination block 220="No"), in determination block 230 the device processor may determine whether automatic dynamic data services are available on the device. As used herein the term "dynamic data services" refers to a process that switches an active data service session from one network subscription to another (i.e., from one SIM to another). There are various circumstances under which such switching between subscriptions, and even subsequent switching back, may be advantageous. Dynamic data services, if available, may be an automatic or manual feature. As an automatic feature, dynamic data services may be enabled (i.e., turned-on) as a device setup option. If dynamic data services are available as an automatic feature (i.e., determination block 230="Yes"), the voice call may be established on SIM1 (i.e., the network subscription transmitting the voice call) in block 234, and the data services session may be reestablished on SIM1 in block 236. In this manner, the data services session is effectively moved from SIM2 to SIM1. The voice call and the data services session will use a single SIM, namely SIM1 in this example, which will actively use the device transceiver, while the other SIM (SIM2) is inactive. Using the network subscription associated with SIM1 the device may establish a voice communication connection to the voice call. Establishing the active voice communication connection includes provisioning and execution of the appropriate protocols in order to receive and transmit a voice communication connection between the device and the caller. Signaling communications available for voice communications may be used to switch the data service session. This operation may include registering the data services session on the other network subscription (i.e., by acquiring an IP address for the data services session), SIM1. Thus, once access to the voice call has been established on the SIM1, the device may switch the data services over to that subscription, SIM1 (i.e., using the simultaneous voice and data capability to connect to the voice call as well as to use data services). Thereafter, the voice call and the data services session may be maintained in block 240.

If dynamic data services are not available as an automatic feature (i.e., determination block 230="No"), the device processor may determine whether manual dynamic data services are available and selected in determination block 232. Manual dynamic data services may prompt a device user for a user input regarding whether the user desires to have dynamic data services authorized. A user may elect to not accept the incoming call or the user may be willing to stop the data services session. Regardless, such a user input may be an active input, requiring the user to provide some form of input, or a passive input, registering user inactivity as a positive or negative input. A positive user input may indicate a data services subscription switch authorization by the user authorizing the device to initiate the switch of the data services session from one subscription to the other. Thus, if manual dynamic data service is available and selected by the user (i.e., determination block 232="Yes"), the voice call may be established on SIM1 in block 234 and the data services session moved from SIM2 to SIM1 in block 236. Alternatively, if manual dynamic data service is not available or not selected by the user (i.e., determination block 232="No"), either the voice call may be established or the data services session maintained in block 235.

Once the data services session is being maintained along with the voice call on SIM1 in block 240, both services may continue in their normal course until ended. The device processor may determine whether the voice call has ended in determination block 250. If the voice call has ended (i.e., determination block 250="Yes") the device processor may determine whether the data services session has also ended in determination block 260. Similarly, if the voice call has not ended (i.e., determination block 250="No") the device processor may determine whether the data services session has ended in determination block 270. If both the voice call and the data services session have ended (i.e., determination block 260="Yes") the process may end in block 280.

If the voice call has ended but the data services session has not ended (i.e., determination block 260="No") the data services session may be switched back to SIM2 in block 262 if necessary. For example, once the voice call ends, the device may switch back to its original DDS. Thus, when SIM2 is the preferred DDS the data services session could be switched back. Otherwise, the data services session may thereafter be maintained in block 264 and periodically checked in determination block 266, to see whether the data services session has ended. Alternatively, if the voice call has not ended but the data services session has ended (i.e., determination block 270="Yes") the voice call may be maintained in block 274 and periodically checked in determination block 276 to see whether the voice call has ended. Once the voice call ends (i.e., determination block 276="Yes") the process may end in block 280.

As noted above, dynamic data services may be implemented by registering the data services session, active on the DDS, with the network associated with the non-DDS. Initially, a connection exists through the DDS subscription, which establishes the data services session. When the voice call is received and an authorization to implement dynamic data services is indicated, the voice call may be setup through the other subscription. The communication device operating system run by the processor may deregister from the data services session of the DDS SIM, in order to then designate the other subscription as the new current DDS subscription, setup the voice call and reregister into the data services session. Unregistering, switching and reregistering to a network should take very little time, so to a user the switch should either not be noticeable or take a nominal amount of time in order to maintain a good user experience.

FIG. 3A illustrates a timeline diagram 300 that demonstrates an example of dynamic data services in accordance with an embodiment. In particular, the diagram 300 illustrates the active status of each SIM during a dynamic data services switch in accordance with an embodiment. The shaded areas above or below the time lines 301, 302 represent an active exchange of either data services D or a voice call V.

The diagram 300 includes separate timelines 301, 302 for each SIM occurring over the same period of time T. During an initial period 310, with start time $T_0$ and end time $T_1$, SIM2 is active using the device transceiver to connect a data services session (D) to Mobile Network$_2$ 152. Also, during that same initial period 310, the communication channel between the device through SIM1 and Mobile Network$_1$ 151 is inactive. Thus, during the initial period 310, SIM2 may be actively receiving/transmitting data from/to the communication device.

The time $T_1$ is also the start time for establishing the voice call V. In this way, the voice call V interrupts an established data services session at time $T_1$. During a voice call initial period 320, with start time $T_1$ and end time $T_2$, the communication channel between the communication device, using the device transceiver, and the Mobile Network$_2$ 151 (using SIM1) is active connecting to the voice call. Also, during that voice call initial period 320, the communication channel between the device and Mobile Network$_2$ 152 (associated with SIM2) is inactive. Thereafter the device, using a single SIM (i.e., SIM1) may reestablish the data services session (D) and maintain active both the voice call V and the data services D (V+D) until one or both services is/are finished. Thus, during the subsequent period 320 both voice services and data services are handled by SIM1. In the illustrative example, at the data services session end time $T_3$ the data services end, but the voice call continues thereafter. Thereafter, during the final period 340, with start time $T_3$ and end time $T_4$, SIM1 is actively handling only the voice call V. The entire period of the voice call 350 is thus the combination of three periods 320, 330, 340.

FIG. 3B illustrates an alternative timeline diagram 305 that demonstrates an example of a situation in which dynamic data services is not used. In particular, the diagram 300 illustrates the active status of each SIM over parallel timelines. Once again the shaded areas below the time line 302 represents an active exchange of either data services D and/or a voice call V.

During an initial period 310, with start time $T_0$ and end time $T_1$, this time SIM1 is active using the device transceiver to connect the data services session (D) to Mobile Network$_1$ 151. Also, during that same initial period 310, the communication channel between the device through SIM2 and Mobile Network$_2$ 152 is inactive. Thus, during the initial period 310, SIM1 may be actively receiving/transmitting data from/to the communication device. The time $T_1$ is once again the start time for establishing the voice call V. This scenario is somewhat different than the that illustrated in FIG. 3A because although the voice call V is received in the middle of the data services session, the voice call does not really interrupt the data services session because no SIM switching is necessary. In this scenario since the voice call is received on the same subscription as the current DDS, the voice call may be established and the data services session may continue uninterrupted. Using a single SIM (i.e., SIM1) during the second period 335 both the voice call V and the data services D (V+D) may be maintained active until one or both services is/are finished. In the illustrative example, once again at the data services session end time $T_3$ the data services end, but the voice call continues thereafter. Thereafter, during the final period 340, with start time $T_3$ and end time $T_4$, SIM1 is actively handling only the voice call V. In this scenario the entire period of the voice call 350 is the same time period as the first scenario but only combines two periods 335, 340.

Figure 4:
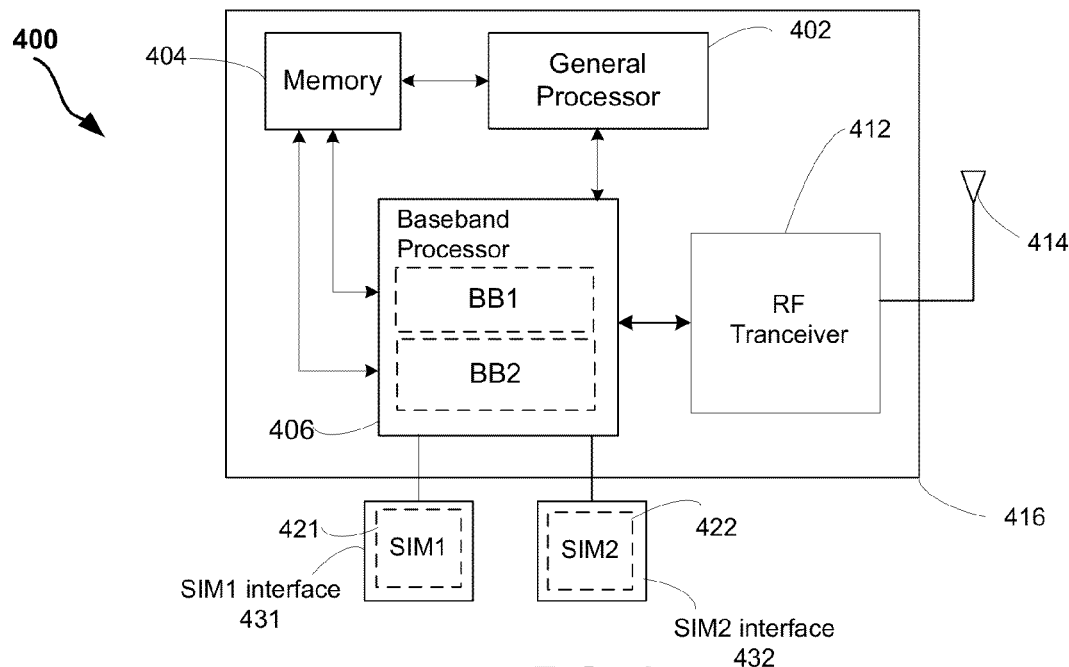
FIG. 4 is a schematic block diagram illustrating an embodiment mobile communication device suitable for various embodiments.

FIG. 4 illustrates functional components of a dual SIM communication device 400 that is suitable for implementing the various embodiments. Wireless device 400 may include at least one controller, such as general processor 402, which may be coupled to at least one memory 404. Memory 404 may store, for example, an operating system (OS) and user application software. Communication device 400 may also include a baseband processor 406 to perform baseband/modem functions. Baseband processor 406 may be a single device that performs baseband/modem functions for all SIMs, or may be multiple independent baseband processors (e.g., BB1, BB2), each of which performs functions for one of the SIMs of communication device 400. At least two SIMs 421, 422 may be connected logically with the at least one baseband processor 406 through SIM interfaces 431, 432.

Communication device 400 may also include a RF transceiver 412 that is connected logically with the baseband processor 406, and with at least one antenna 414. RF transceiver 412 may be a single device that performs transmit/receive functions for all SIMs, or may include separate transmitter and receiver elements, together operating as an RF transceiver for the communication device 400.

In a particular embodiment, the general processor 402, memory 404, and baseband processor 406 may be included in a system-on-chip device 416. SIM1 421 and SIM2 422 and their corresponding interfaces 431, 432 may be external to the system-on-chip device 416. Further, various input and output devices may be coupled to components of the system-on-chip device 416, such as interfaces or controllers.

Figure 5:
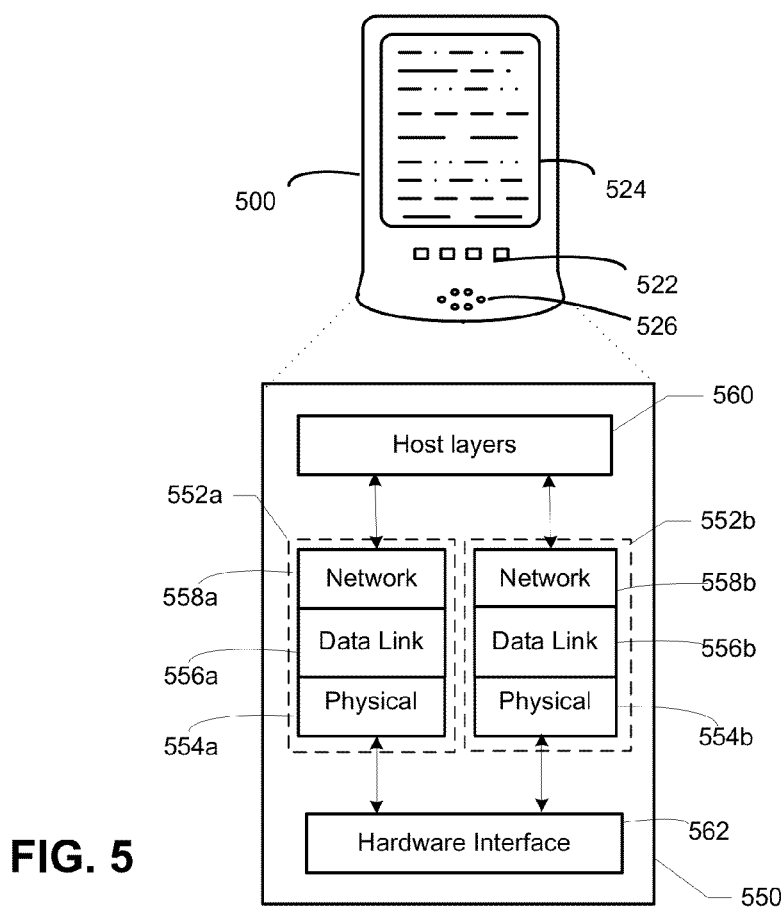
FIG. 5 is a schematic representation of a communication device suitable for various embodiments along with an exemplary layered software architecture.

FIG. 5 illustrates a further example of a communication device 500 suitable for implementing the various embodiments. The communication device 500 may include user interface (UI) components such as but not limited to, keypad 522, touchscreen display 524, microphone 526, etc. In an embodiment, the keypad 522, touchscreen display 524, microphone 526, or a combination thereof, may perform the function of prompting a user for input and receiving the user input, such as the authorization from the user to initiate the switch of the data services session from one subscription to the other (i.e., authorization for dynamic data services). For example, the touchscreen display 524 may receive a user selection representing the authorization for dynamic data services. In another example, either or both of the touchscreen display 524 and microphone 526 may receive the user input regarding the authorization for dynamic data services. Additionally, the authorization for dynamic data services may be in the form of a voice command received via the microphone 526. Interfaces may be provided between the various software modules and functions in communication device 500 to enable communication between them, as is known in the art.

Communication device 500 may have a layered software architecture 550 to communicate over access networks associated with SIMs. The software architecture 550 may be distributed among one or more processors, such as baseband processor 406. In the various embodiments, the software architecture 550 for a dual SIM device may have multiple protocol stacks, each of which may be associated with a different SIM. For example, communication device 500 may be configured with protocol stacks 552a, 552b, associated with SIMs 421, 4. Protocol stacks 552a, 552b may support any of variety of standards and protocols for wireless communications.

The bottom layers of the protocol stacks 552a, 552b may be physical layers 554a, 554b that establish connections over the air interface and manage network resources for the communication device 500. Residing above physical layers 554a, 554b may be data link layers 556a, 556b, which may provide functions to handle incoming and output data across a physical link in the network. For example, data link layers 556a, 556b may divide output data into data frames, and analyze incoming data to ensure it has been successfully received. In an embodiment, each data link layer 556a, 556b may contain various sub-layers (e.g., media access control (MAC) and logical link control (LLC) layers).

Network layers 558a, 558b may reside above data link layers 556a, 556b, which may perform functions including allocating radio channels and establishing links between the communication device 500 and a network. In an embodiment, each network layer 556a, 556b may be partitioned into one or more sub-layers (not shown). In an embodiment, a sub-layer of a network layer 556a, 556b may be a connection management (CM) sub-layer to route calls, select a service type, prioritize data, perform QoS functions, etc.

While protocol stacks 552a, 552b provide functions to transmit data through physical media, the software architecture 550 may further include at least one host layer 560 to provide data transfer services to various applications in communication device 500. In an embodiment, application-specific functions provided by the at least one host layer 560 may provide an interface between protocol stacks 552a, 552b and general processor 402. In an alternative embodiment, the protocol stacks 552a, 552b may each include one or more higher logical layers (e.g., transport, session, presentation, application, etc.) that provide host layer functions. In an embodiment, software architecture 550 may further include a hardware interface 564 between physical layers 554a, 554b and the communication hardware (e.g., one or more RF transceivers).

Figure 6:
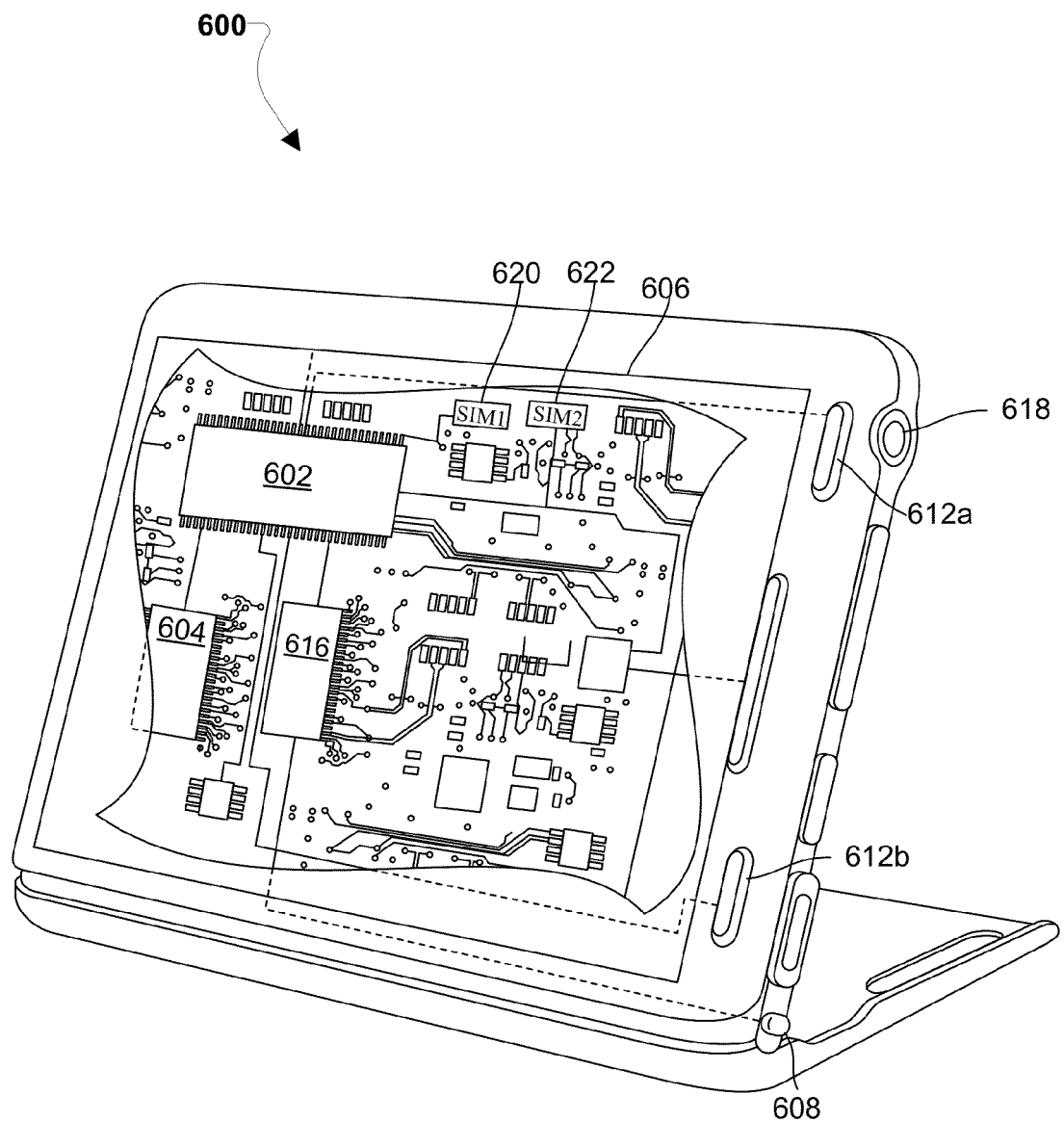
FIG. 6 is a component diagram of an example mobile communication device suitable for use with the various embodiments.

The various embodiments may be implemented in any of a variety of mobile communication devices, an example of which is illustrated in FIG. 6. For example, the mobile communication device 600 may include a processor 602 coupled to internal memory 604. Internal memory 604 may be volatile or non-volatile memory, and may also be secure and/or encrypted memory, or unsecure and/or unencrypted memory, or any combination thereof. The processor 602 may also be coupled to a touch screen display 606, such as a resistive-sensing touch screen, capacitive-sensing touch screen infrared sensing touch screen, or the like. Additionally, the display of the mobile communication device 600 need not have touch screen capability. Additionally, the mobile communication device 600 may have an antenna 608 for sending and receiving electromagnetic radiation that may be connected to a wireless data link and/or cellular telephone transceiver 616 coupled to the processor 602. The mobile communication device 600 may also include physical buttons 612a and 612b for receiving user inputs. The mobile communication device 600 may also include a power button 618 for turning the mobile communication device 600 on and off. The mobile communication device 600 may have a first SIM card 620 and a second SIM card 622 that utilize a cellular telephone transceiver 616 and one or more antennae 608 to connect to a first and a second mobile network, respectively.

Figure 7:
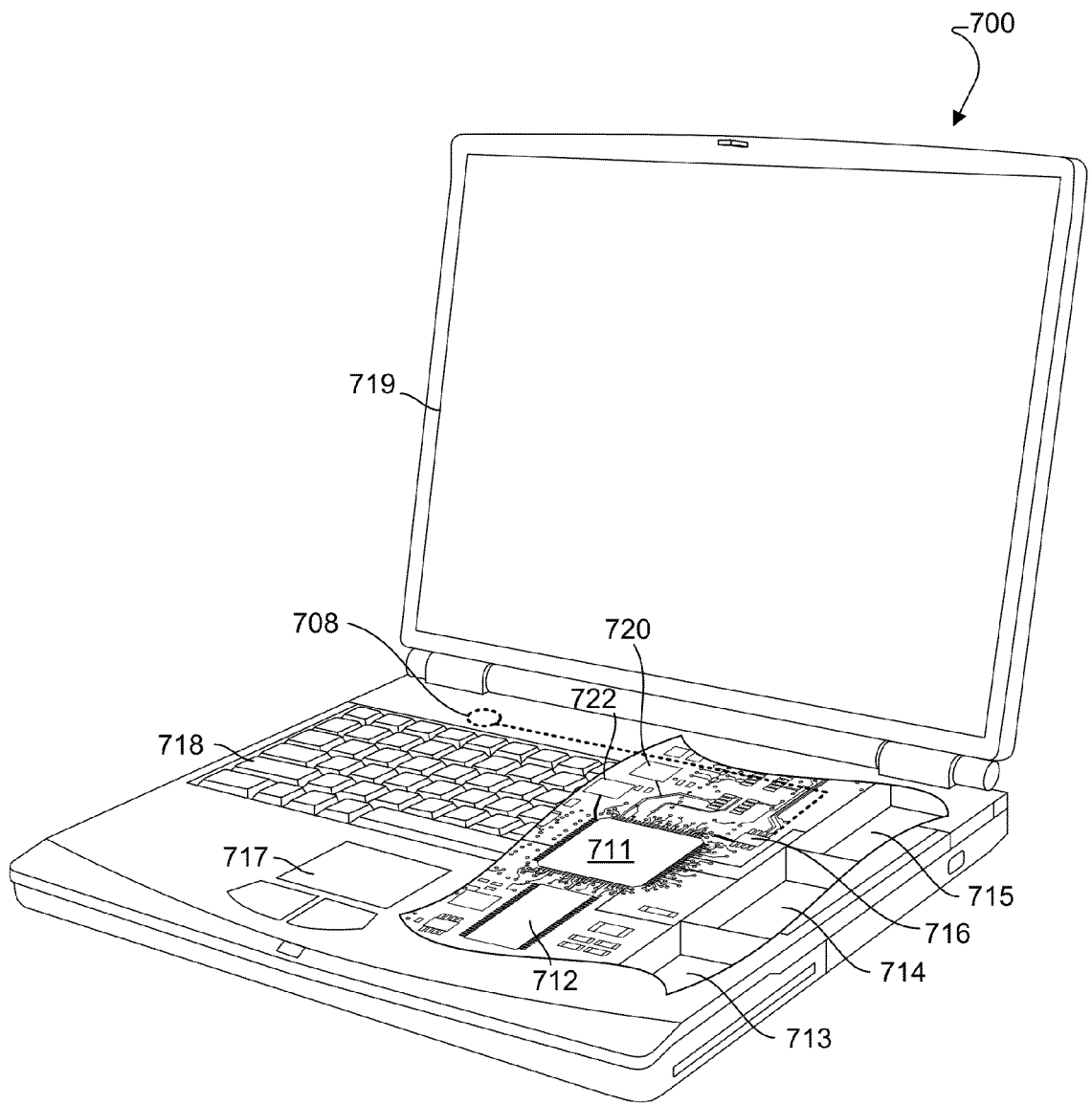
FIG. 7 is a component diagram of another example mobile communication device suitable for use with the various embodiments.

The various embodiments described above may also be implemented within a variety of mobile communication devices, such as a laptop computer 700 illustrated in FIG. 7.

Many laptop computers include a touch pad touch surface 717 that serves as the computer's pointing device, and thus may receive drag, scroll, and flick gestures similar to those implemented on mobile computing devices equipped with a touch screen display and described above. A laptop computer 700 will typically include a processor 711 coupled to volatile memory 712 and a large capacity nonvolatile memory, such as a disk drive 713 of Flash memory. Additionally, the computer 700 may have one or more antenna 708 for sending and receiving electromagnetic radiation that may be connected to a wireless data link and/or cellular telephone transceiver 716 coupled to the processor 711. The computer 700 may also include a floppy disc drive 714 and a compact disc (CD) drive 715 coupled to the processor 711. In a notebook configuration, the computer housing includes the touchpad 717, the keyboard 718, and the display 719 all coupled to the processor 711. Other configurations of the computing device may include a computer mouse or trackball coupled to the processor (e.g., via a USB input) as are well known, which may also be use in conjunction with the various embodiments. The computer 700 may have a first SIM card 720 and a second SIM card 722 that utilize the cellular telephone transceiver 716 and antennae 708 to connect to a first and a second mobile network, respectively.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc, where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of managing a communication device with more than one Subscriber Identity Module (SIM) sharing a transceiver, the method comprising:
   receiving, through the transceiver, a voice call from a first network subscription associated with a first SIM of the communication device, the voice call interrupting an active data services session through the transceiver with a second network subscription associated with a second SIM of the communication device;
   establishing an active voice communication connection for the voice call on the transceiver with the first network subscription; and
   reestablishing the active data services session through the transceiver with the first network subscription while maintaining the active voice communication connection for the voice call with the first network subscription.

2. The method of claim 1, wherein reestablishing the active data services session through the transceiver with the first network subscription is accomplished so that communication of a segment of data being communicated through the transceiver with the second network subscription associated with the second SIM when the voice call is received is completed through the transceiver with the first network subscription associated with the first SIM.

3. The method of claim 1, further comprising:
prompting a user of the communication device regarding whether the user desires to maintain the active data services session in response to receiving the voice call; and
receiving a data services subscription switch authorization derived from a user input in response to prompting the user, the data services subscription switch authorization initiating the active data services session being reestablished with the first network subscription while maintaining the active voice communication connection.

4. The method of claim 1, further comprising maintaining the active data services session using the transceiver with the first network subscription upon termination of the voice call.

5. The method of claim 1, wherein immediately prior to establishing the active voice communication connection the first network subscription is configured to only receive voice services communications.

6. The method of claim 1, wherein reestablishing the active data services session through the transceiver with the first network subscription while maintaining the active voice communication connection for the voice call with the first network subscription comprises reconfiguring the first network subscription from voice services to both data services and voice services.

7. A communication device, comprising:
a first SIM;
a second SIM;
a memory;
a transceiver; and
a processor coupled to the memory, the transceiver, the first SIM, and the second SIM, wherein the processor is configured with processor-executable instructions stored in the memory to perform operations comprising:
receiving, through the transceiver, a voice call from a first network subscription associated with the first SIM of the communication device, the voice call interrupting an active data services session through the transceiver with a second network subscription associated with the second SIM of the communication device;
establishing an active voice communication connection for the voice call on the transceiver with the first network subscription; and
reestablishing the active data services session through the transceiver with the first network subscription while maintaining the active voice communication connection for the voice call with the first network subscription.

8. The communication device of claim 7, wherein the processor is configured with the processor-executable instructions to perform operations such that reestablishing the active data services session through the transceiver with the first network subscription is accomplished so that communication of a segment of data being communicated through the transceiver with the second network subscription associated with the second SIM when the voice call is received is completed through the transceiver with the first network subscription associated with the first SIM.

9. The communication device of claim 7, wherein the processor is further configured with the processor-executable instructions to:
prompt a user of the communication device regarding whether the user desires to maintain the active data services session in response to receiving the voice call; and
receive a data services subscription switch authorization derived from a user input in response to prompting the user, the data services subscription switch authorization initiating the active data services session being reestablished with the first network subscription while maintaining the active voice communication connection.

10. The communication device of claim 7, wherein the processor is further configured with the processor-executable instructions to maintain the active data services session using the transceiver with the first network subscription upon termination of the voice call.

11. The communication device of claim 7, wherein the processor is configured with the processor-executable instructions to perform operations such that immediately prior to establishing the active voice communication connection the first network subscription is configured to only receive voice services communications.

12. The communication device of claim 7, wherein the processor is configured with the processor-executable instructions to perform operations such that reestablishing the active data services session through the transceiver with the first network subscription while maintaining the active voice communication connection for the voice call with the first network subscription comprises reconfiguring the first network subscription from voice services to both data services and voice services.

13. A communication device, comprising:
means for receiving a voice call from a first network subscription associated with a first Subscriber Identity Module (SIM) of the communication device, the voice call interrupting an active data services session with a second network subscription associated with a second SIM of the communication device;
means for establishing an active voice communication connection for the voice call with the first network subscription; and
means for reestablishing the active data services session with the first network subscription while maintaining the active voice communication connection for the voice call with the first network subscription.

14. The communication device of claim 13, wherein means for reestablishing the active data services session with the first network subscription comprises means for reestablishing the active data services session with the first network subscription so that communication of a segment of data being communicated with the second network subscription associated with the second SIM when the voice call is received is completed with the first network subscription associated with the first SIM.

15. The communication device of claim 13, further comprising:
means for prompting a user of the communication device regarding whether the user desires to maintain the active data services session in response to receiving the voice call; and
means for receiving a data services subscription switch authorization derived from a user input in response to prompting the user, the data services subscription switch authorization initiating the active data services session being reestablished with the first network subscription while maintaining the active voice communication connection.

16. The communication device of claim 13, further comprising means for maintaining the active data services session with the first network subscription upon termination of the voice call.

17. The communication device of claim 13, wherein immediately prior to establishing the active voice communication connection the first network subscription is configured to only receive voice services communications.

18. The communication device of claim 13, wherein means for reestablishing the active data services session with the first network subscription while maintaining the active voice communication connection for the voice call with the first network subscription comprises means for reconfiguring the first network subscription from voice services to both data services and voice services.

19. A non-transitory processor-readable storage medium having stored thereon processor-executable instructions configured to cause a processor of a communication device having a first Subscriber Identity Module (SIM), a second SIM and a transceiver to perform operations comprising:
 receiving, through the transceiver, a voice call from a first network subscription associated with the first SIM of the communication device, the voice call interrupting an active data services session through the transceiver with a second network subscription associated with the second SIM of the communication device;
 establishing an active voice communication connection for the voice call on the transceiver with the first network subscription; and
 reestablishing the active data services session through the transceiver with the first network subscription while maintaining the active voice communication connection for the voice call with the first network subscription.

20. The non-transitory processor-readable storage medium of claim 19, wherein the processor-executable instructions are configured to cause the processor of the communication device to perform operations such that reestablishing the active data services session through the transceiver with the first network subscription is accomplished so that communication of a segment of data being communicated through the transceiver with the second network subscription associated with the second SIM when the voice call is received is completed through the transceiver with the first network subscription associated with the first SIM.

21. The non-transitory processor-readable storage medium of claim 19, wherein the processor-executable instructions are configured to cause the processor of the communication device to perform operations further comprising:
 prompting a user of the communication device regarding whether the user desires to maintain the active data services session in response to receiving the voice call; and
 receiving a data services subscription switch authorization derived from a user input in response to prompting the user, the data services subscription switch authorization initiating the active data services session being reestablished with the first network subscription while maintaining the active voice communication connection.

22. The non-transitory processor-readable storage medium of claim 19, wherein the processor-executable instructions are configured to cause the processor of the communication device to perform operations further comprising maintaining the active data services session using the transceiver with the first network subscription upon termination of the voice call.

23. The non-transitory processor-readable storage medium of claim 19, wherein the processor-executable instructions are configured to cause the processor of the communication device to perform operations such that immediately prior to establishing the active voice communication connection the first network subscription is configured to only receive voice services communications.

24. The non-transitory processor-readable storage medium of claim 19, wherein the processor-executable instructions are configured to cause the processor of the communication device to perform operations such that reestablishing the active data services session through the transceiver with the first network subscription while maintaining the active voice communication connection for the voice call with the first network subscription comprises reconfiguring the first network subscription from voice services to both data services and voice services.

\* \* \* \* \*

UNITED STATES PATENT AND TRADEMARK OFFICE
CERTIFICATE OF CORRECTION

| | | |
|---|---|---|
| PATENT NO. | : 9,066,330 B2 | Page 1 of 1 |
| APPLICATION NO. | : 14/041672 | |
| DATED | : June 23, 2015 | |
| INVENTOR(S) | : Hang et al. | |

It is certified that error appears in the above-identified patent and that said Letters Patent is hereby corrected as shown below:

IN THE CLAIMS

Column 13, line 28, cancel the text beginning with "7. A communication device, comprising" to and ending "subscription." in column 13, line 51, and insert the following claim:

--7. A communication device, comprising:
    a memory;
    a transceiver; and
    a processor coupled the transceiver, wherein the processor is configured with processor-executable instructions to:
        receive, through the transceiver, a voice call from a first network subscription associated with a first Subscriber Identity Module (SIM) of the communication device, the voice call interrupting an active data services session through the transceiver with a second network subscription associated with a second SIM of the communication device;
        establish an active voice communication connection for the voice call on the transceiver with the first network subscription; and
        reestablish the active data services session through the transceiver with the first network subscription while maintaining the active voice communication connection for the voice call with the first network subscription.--

Signed and Sealed this
Seventeenth Day of November, 2015

Michelle K. Lee
*Director of the United States Patent and Trademark Office*